United States Patent
Smith et al.

(10) Patent No.: US 7,019,940 B2
(45) Date of Patent: Mar. 28, 2006

(54) UNIVERSAL CARTRIDGE MAGAZINE SYSTEM AND METHOD

(75) Inventors: Mark A. Smith, Holdrege, NE (US); Leslie G. Christie, Jr., Greeley, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 595 days.

(21) Appl. No.: 09/961,990

(22) Filed: Sep. 24, 2001

(65) Prior Publication Data

US 2003/0058747 A1    Mar. 27, 2003

(51) Int. Cl.
*G11B 15/68* (2006.01)

(52) U.S. Cl. .......................................... 360/92
(58) Field of Classification Search ............. 360/92, 360/94, 96.5
See application file for complete search history.

(56) References Cited

U.S. PATENT DOCUMENTS

| | | | | |
|---|---|---|---|---|
| 4,998,232 A | | 3/1991 | Methlie et al. | 369/36 |
| 5,032,939 A | * | 7/1991 | Mihara et al. | 360/94 |
| 5,062,093 A | | 10/1991 | Christie et al. | 369/36 |
| 5,544,146 A | | 8/1996 | Luffel et al. | 369/178 |
| 5,596,556 A | | 1/1997 | Luffel et al. | 369/36 |
| 5,644,559 A | | 7/1997 | Christie, Jr. et al. | 369/36 |
| 5,662,539 A | | 9/1997 | Schmidtke et al. | 474/101 |
| 5,680,375 A | | 10/1997 | Christie, Jr. et al. | 369/30 |
| 5,682,096 A | | 10/1997 | Christie, Jr. et al. | 324/207.2 |
| 5,687,039 A | | 11/1997 | Coffin et al. | 360/92 |
| 5,721,716 A | | 2/1998 | Luffel et al. | 369/36 |
| 5,726,971 A | | 3/1998 | Wanger et al. | 369/291 |
| 5,730,031 A | | 3/1998 | Paul et al. | 74/490.07 |
| 5,746,464 A | | 5/1998 | Paul | 294/116 |
| 5,761,032 A | | 6/1998 | Jones | 361/385 |
| 5,918,958 A | | 7/1999 | Paul et al. | 312/330.1 |
| 5,926,341 A | | 7/1999 | Mueller et al. | 360/92 |
| 5,993,045 A | | 11/1999 | Schmidtke et al. | 364/478.06 |
| 5,995,477 A | | 11/1999 | Smith et al. | 369/178 |
| 5,996,741 A | | 12/1999 | Jones et al. | 187/250 |
| 5,999,500 A | | 12/1999 | Mueller | 369/35 |
| 6,025,972 A | | 2/2000 | Schmidtke et al. | 360/98.06 |
| 6,028,733 A | | 2/2000 | Schmidtke et al. | 360/92 |
| 6,042,205 A | | 3/2000 | Coffin et al. | 312/332.1 |

(Continued)

OTHER PUBLICATIONS

Patent Abstracts of Japan, Publication number: 05-036178, Date of publication of application: Feb. 12, 1993.

*Primary Examiner*—Robert S. Tupper

(57) ABSTRACT

A universal cartridge magazine system and method are disclosed for storing cartridge systems. The cartridge magazine system comprising a pivoted member, a flag positioner and a sleeve designed to accept the cartridge system, the sleeve having a first side. The pivoted member has a leg and an arm, the leg having a slanted surface, wherein the pivoted member is designed to allow full insertion of the cartridge system in the sleeve if the cartridge system is inserted in a correct orientation, and wherein the pivoted member prevents full insertion of the cartridge system in the sleeve if the cartridge system is not in the correct orientation. The flag positioner comprising a support arm, the support arm having a flag extending outside of the sleeve, wherein the flag is designed to be located at a first position if the sleeve does not contain a fully inserted cartridge system, a second position if the sleeve contains a fully inserted first type of linear tape cartridge system, and a third position if the sleeve contains a fully inserted second type of linear tape cartridge system.

20 Claims, 11 Drawing Sheets

U.S. PATENT DOCUMENTS

| | | | |
|---|---|---|---|
| 6,085,975 A | 7/2000 | Irvine et al. | 235/383 |
| 6,104,693 A | 8/2000 | Coffin et al. | 369/178 |
| 6,141,180 A | 10/2000 | Smith | 360/96.5 |
| 6,157,513 A | 12/2000 | Coffin et al. | 360/92 |
| 6,160,786 A | 12/2000 | Coffin et al. | 369/178 |
| 6,175,539 B1 | 1/2001 | Holmquist et al. | 369/34 |
| 6,222,699 B1 | 4/2001 | Luffel et al. | 360/92 |
| 6,226,252 B1 | 5/2001 | Coffin et al. | 369/178 |
| 6,231,291 B1 | 5/2001 | Mueller et al. | 414/277 |
| 6,233,215 B1 | 5/2001 | Paul et al. | 369/75.1 |
| 6,310,745 B1 | 10/2001 | Smith | |
| 6,526,017 B1 | 2/2003 | Smith | |
| 2002/0006030 A1 | 1/2002 | Evanson et al. | |
| 2003/0058747 A1 | 3/2003 | Smith et al. | |

* cited by examiner

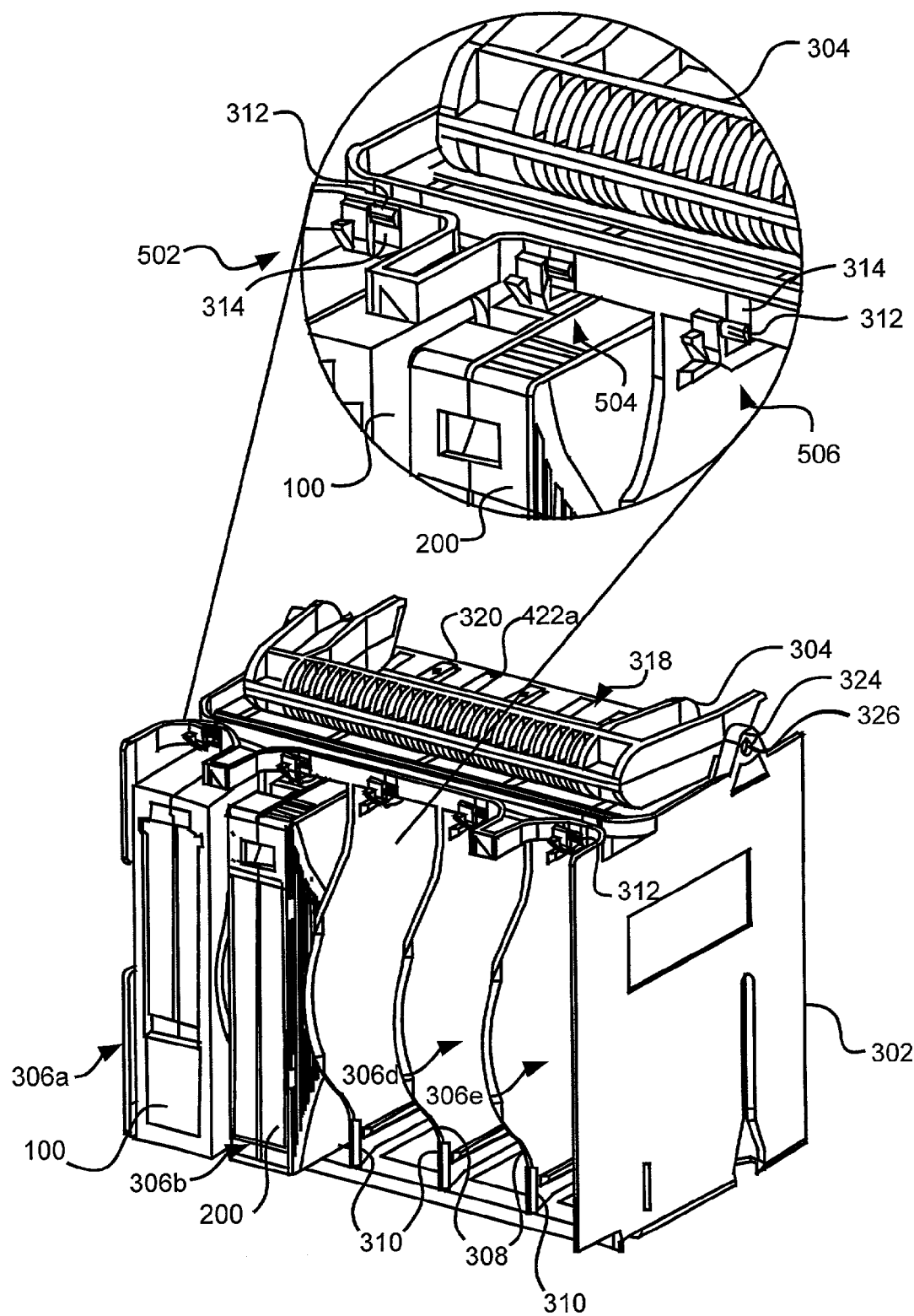

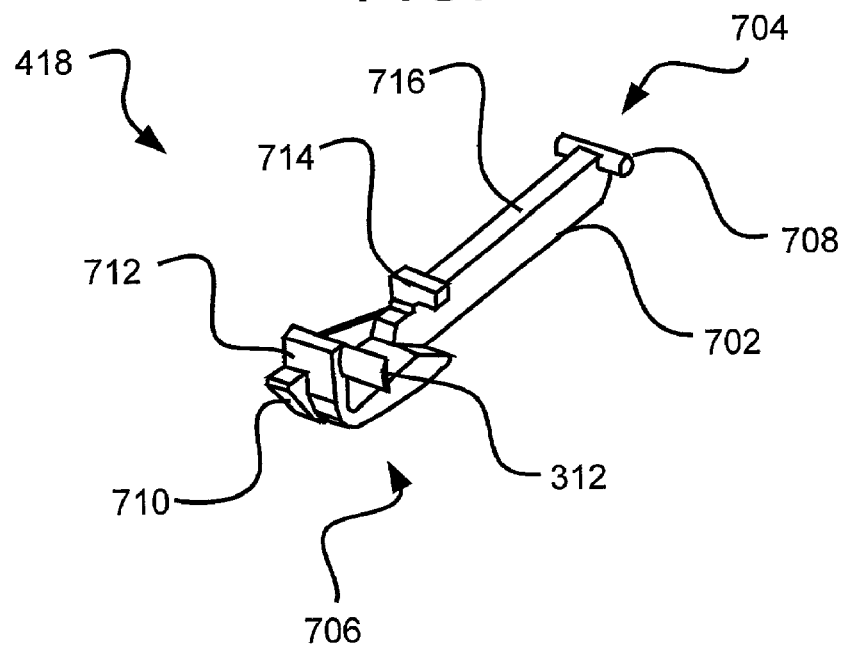
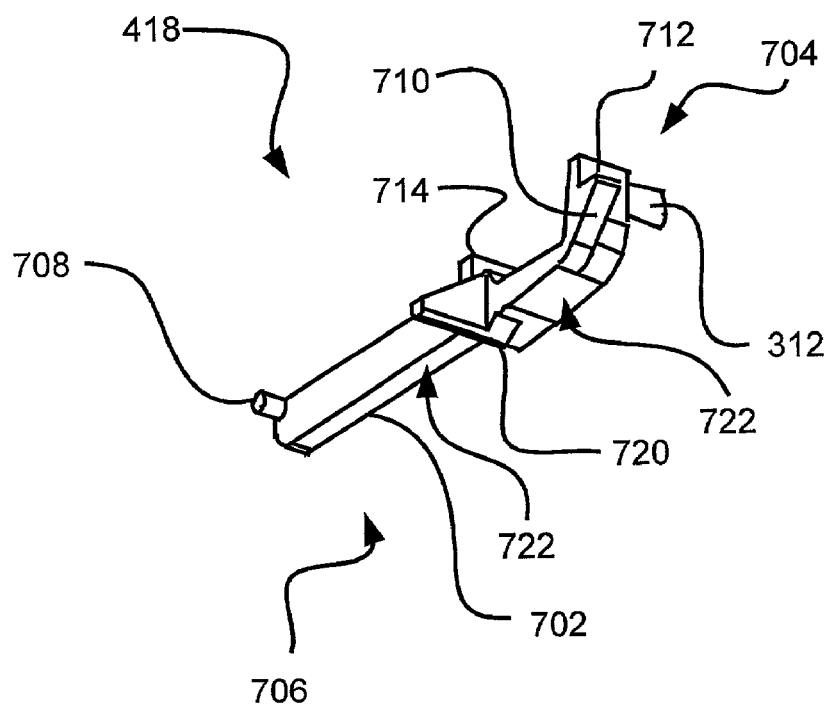

UNIVERSAL CARTRIDGE MAGAZINE SYSTEM AND METHOD

TECHNICAL FIELD

The present invention is generally related to digital data storage and handling systems and methods and, more particularly, is related to a universal cartridge magazine system and method.

BACKGROUND OF THE INVENTION

Since the introduction of computers there has been an ever increasing need for systems capable of storing large amounts of digital data. Ideally, digital data storage systems also provide convenient access to the stored data at the lowest possible cost. In the last five years, the need for storing digital data has grown by as much as fifty percent (50%) to one hundred percent (100%) per year. The growth in the need for digital data storage systems has led to various linear tape technologies capable of efficiently storing large amounts of data. Two of the leading linear tape technologies are digital linear tape (DLT) technology and linear tape open (LTO) technology. The linear tape technologies package linear magnetic tape in housing systems. The tape and housing systems may be collectively referred to as DLT cartridge systems and LTO cartridge systems, respectively. Though some cartridge system features may vary depending upon the manufacturer of the cartridge system, those having ordinary skill in the art are familiar with the standard features of DLT cartridge systems and LTO cartridge systems.

FIG. 1 shows a side view of a typical prior art DLT cartridge system 100. A DLT cartridge housing 102 has a generally square shape with a top 104, a bottom 106, a rear side 108, and an exposed side 110 that are each approximately 4.1" (105 mm). The DLT cartridge housing 102 has a right side 112 and a left side (not shown) that are separated by approximately 1" (25.4 mm). The DLT cartridge housing 102 also has a first corner 114. In the top portion 120 of the DLT cartridge housing 102 is a cavity 122. In the cavity 122 are two ribs 116. The DLT cartridge housing 102 also has a bottom portion 118.

FIG. 2 shows a side view of a typical prior art LTO cartridge system 200 targeted at applications requiring ultra-high capacity backup. The LTO cartridge housing 202 has a generally rectangular shape with a top 204 and a bottom 206 that are each approximately 4" (102 mm). The LTO cartridge also has a rear side 208 and an exposed side 210 that are each approximately 4.1" (105 mm). The LTO cartridge housing 202 has a right side 212 and a left side (not shown) that are separated by approximately 0.8" (21.5 mm). The LTO cartridge housing 202 also has a partially recessed first corner 214 that forms a recess 222 in the top portion 220 of the LTO cartridge housing 202. The top 204 has a notch 216. The LTO cartridge housing 202 also has a bottom portion 218. LTO cartridge housings are thus slightly slimmer than DLT cartridge housings.

Digital data storage systems generally include a controller, one or more drive systems, one or more cartridge moving systems, and a plurality of receiving devices for storing cartridge systems. In operation, a plurality of cartridge systems are placed into a plurality of receiving devices. The receiving devices may be a removable or fixed cartridge magazine, an automatic tape cartridge picker, a library, a storage rack, a mail slot, or any of various other receiving devices known to those having ordinary skill in the art. The receiving devices may include one or more sleeves for storing the cartridge systems. The cartridge systems are generally inserted into the receiving devices and/or sleeve with the rear side of the cartridge system facing into the receiving device and/or sleeve. That is, the rear side of the cartridge system is inserted into the receiving device and/or sleeve first. The cartridge moving system transports a selected cartridge system to a drive system as the controller calls for stored data to be read from the selected cartridge system, or as the controller orders the writing of data to the selected cartridge system. When the drive system has completed its task, the cartridge moving system transports the cartridge system to one of the plurality of receiving devices and/or sleeves.

Magazines are generally portable devices that include a housing that forms a plurality of sleeves. Some magazine sleeves are configured to hold a DLT cartridge system and others are configured to hold an LTO cartridge system. A sleeve configured to store an LTO cartridge system may be generally similar to a sleeve configured to store a DLT cartridge system. However, the sleeve configured to store the LTO cartridge system may be narrower or have some structure, such as ribs, to bias the LTO cartridge system to the opposing side of the sleeve.

Also, a sleeve configured to hold one type of cartridge system may have a lockout system that is not compatible with another type of cartridge system. The lockout system is designed to prevent the insertion of a cartridge system in an incorrect orientation that would render the tape unreadable by the data storage system. For example, sleeves configured to store DLT cartridge systems 100 may be associated with a DLT lockout system to ensure the DLT cartridge systems 100 are inserted into the sleeve in the correct orientation. Although, the "correct orientation" depends upon the configuration of the digital data storage system, generally the DLT cartridge system 100 is inserted into the sleeve such that the rear side 108 is inserted first and therefore ends up toward the back of the sleeve. The DLT lockout system may include a protrusion that lines up with the cavity 122 of the DLT cartridge system 100 only when the DLT cartridge system 100 is inserted in the correct orientation.

Digital data storage systems may also include an identification system that allows the controller of the digital data storage system, or the host computer system, to read information regarding the data stored on the linear tape of the cartridge system without having to read the tape. The module is often read by an interface that does not require a physical connection between the cartridge system and the identification system. The identification system may include a barcode system.

Various aspects of digital data storage systems that may include magazine sleeves configured to store cartridge systems are described in the following U.S. patents: U.S. Pat. No. 6,231,291, entitled "Method and Apparatus for Exchanging Data Cartridges in a Jukebox Data Storage System," issues to Mueller, et al.; U.S. Pat. No. 6,222,699, entitled "Modular Data Storage System Utilizing a Wireless Cartridge Access Device," issued to Luffel, et al.; U.S. Pat. No. 6,175,539, entitled "System and Method for Providing Wireless Control Signals to Cartridge Access Device in a Cartridge Storage System," issued to Holmquist, et al.; U.S. Pat. No. 6,160,786, entitled "Cartridge Engaging Assembly with Rack Drive Thumb Actuator System," issued to Coffin, et al.; U.S. Pat. No. 6,141,180, entitled "Method and Apparatus for a Digital Linear Tape Lockout System," to Smith; U.S. Pat. No. 6,085,975, entitled "Barcode Module for an Automated Data Storage Library," issued to Irvine, et al;

U.S. Pat. No. 6,042,205, entitled "Media Holding Device Incorporating a Media Locking Mechanism," issued to Coffin, et al.; U.S. Pat. No. 5,999,500, entitled "Data Cartridge Interlock Release Actuator System," issued to Mueller, et al. An apparatus and method for retaining at least two different sizes of data cartridges is described in U.S. patent application Ser. No. 09/791,107 entitled "Apparatus and Method for Retaining Different Sizes of Data Cartridges in a Storage Magazine," filed Feb. 22, 2001 by Coffin, et al. The patents, and the application, identified above are entirely incorporated herein by reference.

Various aspects of digital data storage systems have been described above as they apply to systems for either DLT cartridge systems 100 or for LTO cartridge systems 200. However, it would be useful to have a digital data storage system capable of storing, accessing and handling DLT cartridge systems 100 and LTO cartridge systems 200. In particular, it would be useful to have a magazine system for storing and handling DLT cartridge systems 100 and LTO cartridge systems 200.

SUMMARY OF THE INVENTION

The present invention provides a cartridge magazine system comprising a pivoted member, a flag positioner and a sleeve designed to accept the cartridge system, the sleeve having a first side. The pivoted member has a leg and an arm, the leg having a slanted surface, wherein the pivoted member is designed to allow full insertion of the cartridge system in the sleeve if the cartridge system is inserted in a correct orientation, and wherein the pivoted member prevents full insertion of the cartridge system in the sleeve if the cartridge system is not in the correct orientation. The flag positioner comprising a support arm, the support arm having a flag extending outside of the sleeve, wherein the flag is designed to be located at a first position if the sleeve does not contain a fully inserted cartridge system, a second position if the sleeve contains a fully inserted first type of linear tape cartridge system, and a third position if the sleeve contains a fully inserted second type of linear tape cartridge system.

The present invention also provides a lockout system for a cartridge magazine. The lockout system ensures that a cartridge system is inserted in a sleeve in a correct orientation. The cartridge system have a rear side. The lockout system comprising a sleeve and a pivoted member. The sleeve designed to accept the cartridge system. The pivoted member has a leg and an arm, wherein the pivoted member is designed to allow full insertion of the cartridge system in the sleeve if the cartridge system is inserted in a correct orientation, and wherein the pivoted member prevents full insertion of the cartridge system in the sleeve if the cartridge system is partially inserted in an incorrect orientation, wherein the arm of the pivoted member rotates into the cavity of a first type of linear tape cartridge system if the first type of linear tape cartridge system is inserted into the sleeve in a correct orientation and wherein the leg of the pivoted member fits in the recess of a second type of linear tape cartridge system if the second type of linear tape cartridge system is inserted in the correct orientation, wherein the arm of the pivoted member makes contact with the cartridge system if the cartridge system is partially inserted in an incorrect orientation, and wherein the contact with the cartridge system prevents full insertion of the cartridge system.

The present invention also provides an indicator system for a cartridge magazine, the cartridge magazine having a sleeve, the sleeve designed for storing a cartridge system, the indicator system providing an indication of the contents of the sleeve. The indicator system comprising a support arm and a flag. The support having a first end and a second end, the first end comprising a pivot, the second end comprising a flag, the support arm having a vertical stop and a dimple. The flag being included in the second end of the support arm, wherein the pivot is designed to partially support the support arm while allowing partial rotation of the support arm about the pivot, wherein the vertical stop is designed to partially support the support arm if the sleeve is empty; wherein the dimple is designed to sit on the top surface of a first type of linear tape cartridge system when the first type of linear tape cartridge system is fully inserted, wherein the dimple is designed to slide on the top surface of a second type of linear tape cartridge system while the second type of linear tape cartridge system is being inserted in the sleeve and wherein the dimple is designed to fall into a notch of the second type of linear tape cartridge system when the second type of linear tape cartridge system is fully inserted in the sleeve, and wherein the flag is designed to be located at a first position when the sleeve is empty, a second position when the sleeve contains the first type of linear tape cartridge system, and a third position when the sleeve contains the second type of linear tape cartridge system.

The present invention also provides a biasing system for a cartridge magazine housing having a sleeve. The sleeve having a first side and a second side. The sleeve designed to accept a cartridge system. The cartridge system having a top portion and a bottom portion. The biasing system comprising a spring and a pivoted member. The spring mounted on the second side of the sleeve. The spring designed to urge the bottom of the cartridge system toward the first side of the sleeve. The pivoted member having a slanted surface. The slanted surface designed to urge the top portion of a linear tape cartridge system to the first side of the sleeve.

The present invention also provides a method for ensuring a cartridge system is inserted in a sleeve in a correct orientation, the cartridge system having a rear side, the method comprising the steps of providing a sleeve and providing a pivoted member. The sleeve designed to accept the cartridge system. The pivoted member having an arm and a leg, wherein the pivoted member is designed to allow full insertion of the cartridge system in the sleeve if the cartridge system is inserted in a correct orientation, and wherein the pivoted member prevents full insertion of the cartridge system in the sleeve if the cartridge system is partially inserted in an incorrect orientation, wherein the arm of the pivoted member rotates into a cavity of a first type of linear tape cartridge system if the first type of linear tape cartridge system is inserted into the sleeve in a correct orientation and wherein the leg of the pivoted member fits in a recess of a second type of linear tape cartridge system if the second type of linear tape cartridge system is inserted in the correct orientation, wherein the arm of the pivoted member makes contact with the cartridge system if the cartridge system is partially inserted in an incorrect orientation, and wherein the contact with the cartridge system prevents full insertion of the cartridge system.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 5 is a perspective view of the universal cartridge magazine system of FIG. 3 having a DLT cartridge system inserted into one sleeve, an LTO cartridge system inserted into a second sleeve, and a third sleeve that is empty.

FIG. 7A is a first perspective view of the flag positioner of the universal cartridge magazine system of FIGS. 3, 4 and 5.

FIG. 7B is a second perspective view of the flag positioner of the universal cartridge magazine system of FIGS. 3, 4 and 5.

DETAILED DESCRIPTION OF THE PREFERRED EMBODIMENT

Figure 1:
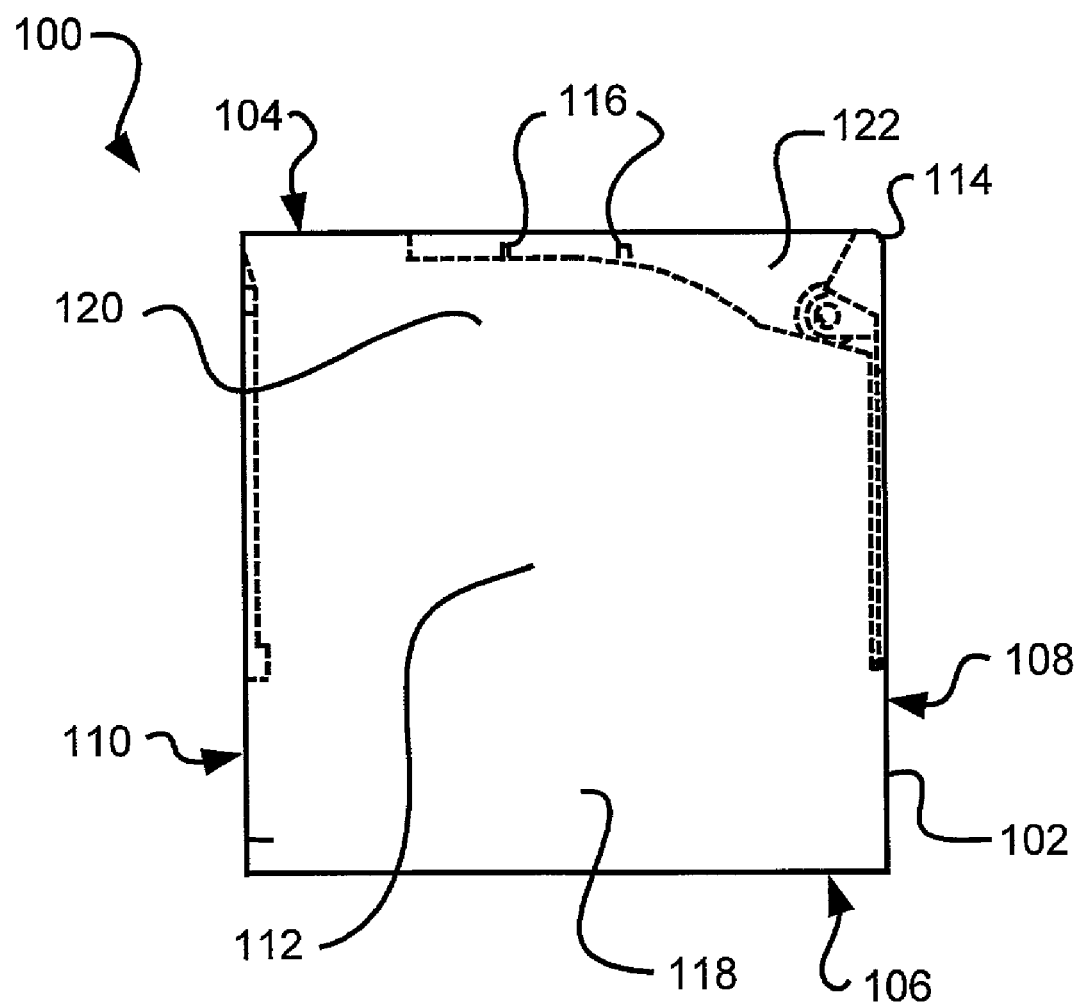
FIG. 1 is a side view of a prior art digital linear tape (DLT) cartridge system.
Figure 2:
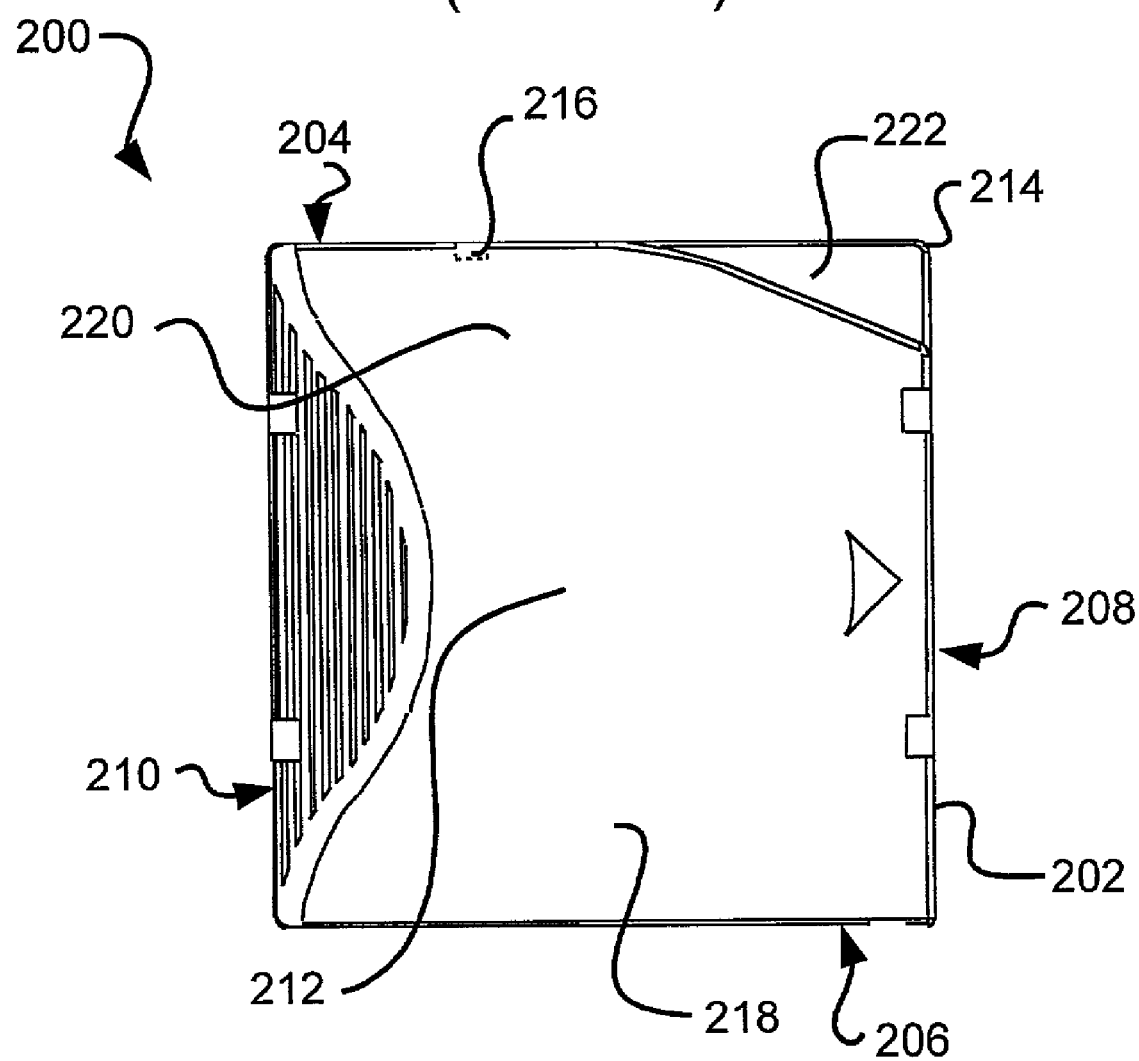
FIG. 2 is a side view of a prior art linear tape open (LTO) cartridge system.
Figure 3:
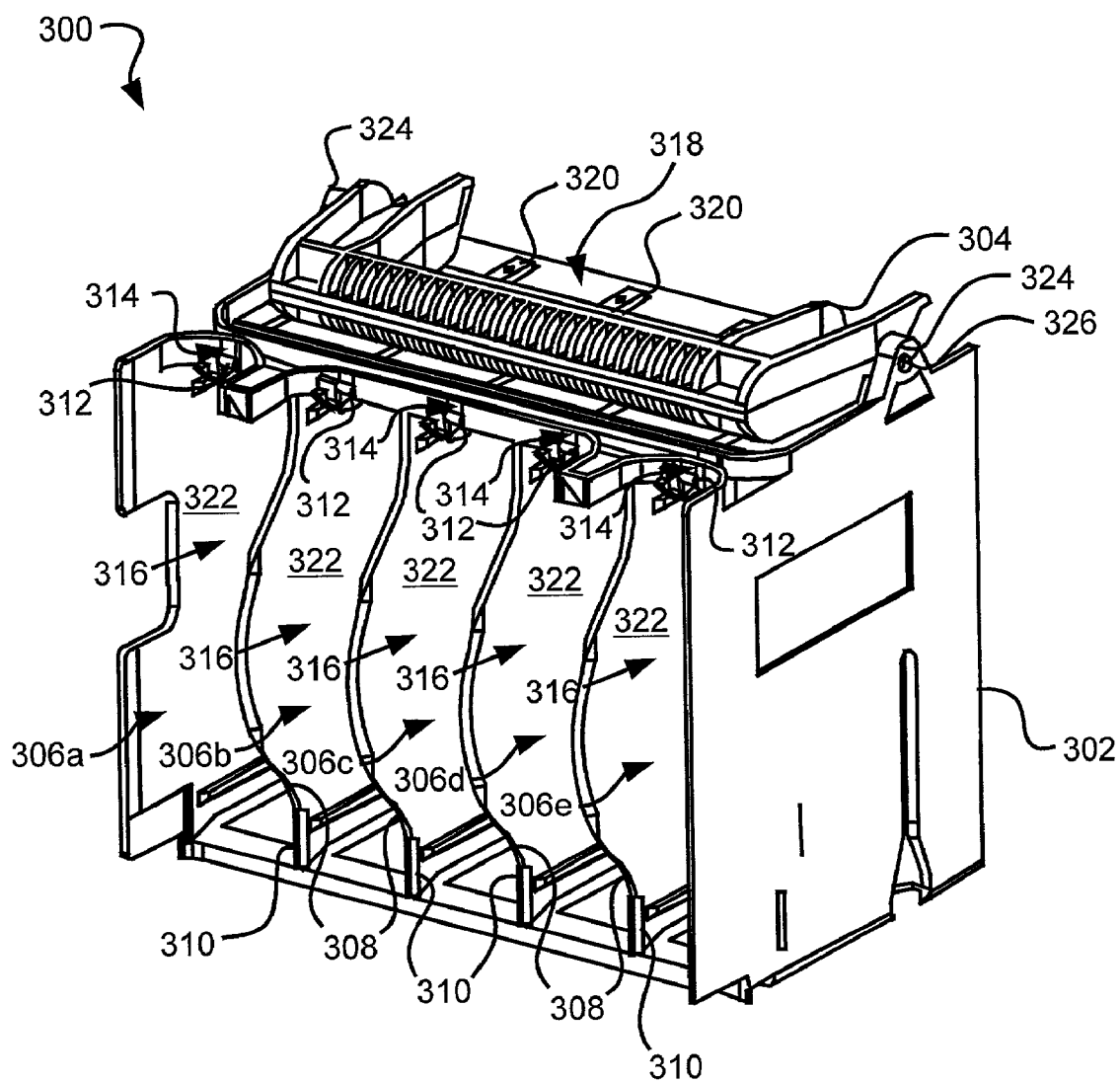
FIG. 3 is a perspective view of an embodiment of a universal cartridge magazine system according to the present invention for storing and handling the cartridge systems of FIGS. 1 and 2 including a plurality of sleeves.

FIG. 3 is a perspective view of an embodiment of a universal cartridge magazine system 300 according to the present invention for storing and handling cartridge systems such as the DLT cartridge system 100 of FIG. 1 and the LTO cartridge system 200 of FIG. 2. The universal cartridge magazine system 300 includes a housing 302 and a handle 304. The housing may be a dark color, such as black, to contrast with the color, such as white, of indicator pad 314. The housing 302 has five sleeves, 306a, 306b, 306c, 306d, and 306e, separated by four sleeve dividers 308. The sleeves 306a, 306b, 306c, 306d, and 306e do not differ as far as the invention is concerned. Therefore, reference numeral "306" is used to refer to any of the individual sleeves 306 throughout this disclosure. Sleeve 306 has a first side 322, a second side (not shown) that is opposite the first side 322, a back side 801 (FIG. 8A) that is not visible in FIG. 3 but is in the direction of arrow 316, and an exposed end visible in FIG. 3. Though FIG. 3 shows the first side 322 and the second side (not shown) as walls (i.e. the second side being the non-visible side of sleeve dividers 308 for sleeves 306a, 306b, 306c, and 306d), it is not necessary that the first side 322 and the second side (not shown) be solid as long as the sleeve is capable of supporting a cartridge system that is inserted into the sleeve 306.

The handle 304 pivots about two stub axles 414 (one shown in FIG. 4) protruding from the sides of the handle 304. The stub axles 414 (FIG. 4) fit into holes 326 (one shown in FIG. 3) in handle supports 324 at each end of the top 318 of the universal cartridge magazine 300.

Figure 4:
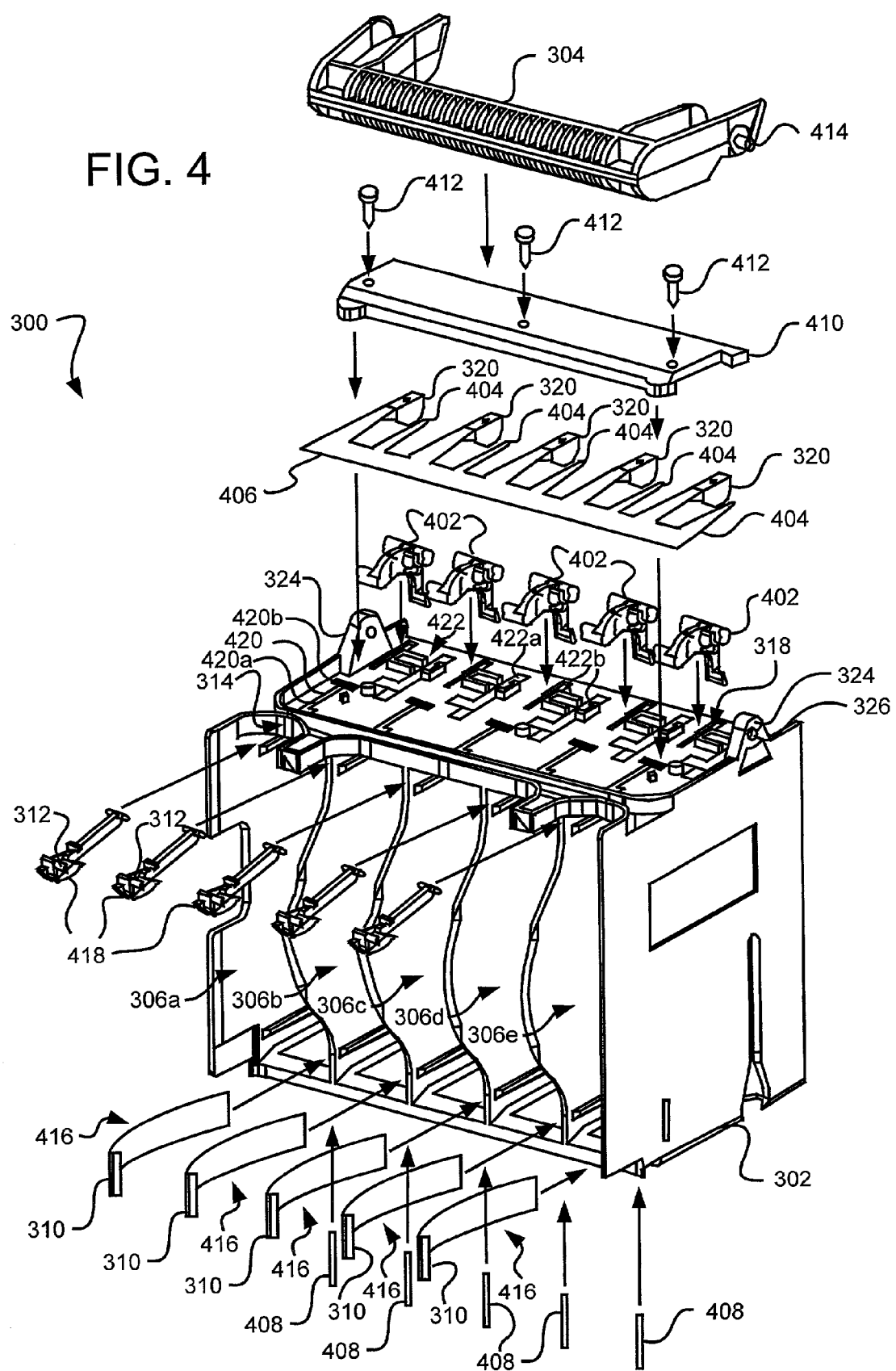
FIG. 4 is a perspective exploded view of the universal cartridge magazine system of FIG. 3 showing a pivoted member and a flag positioner.
Figure 6A:
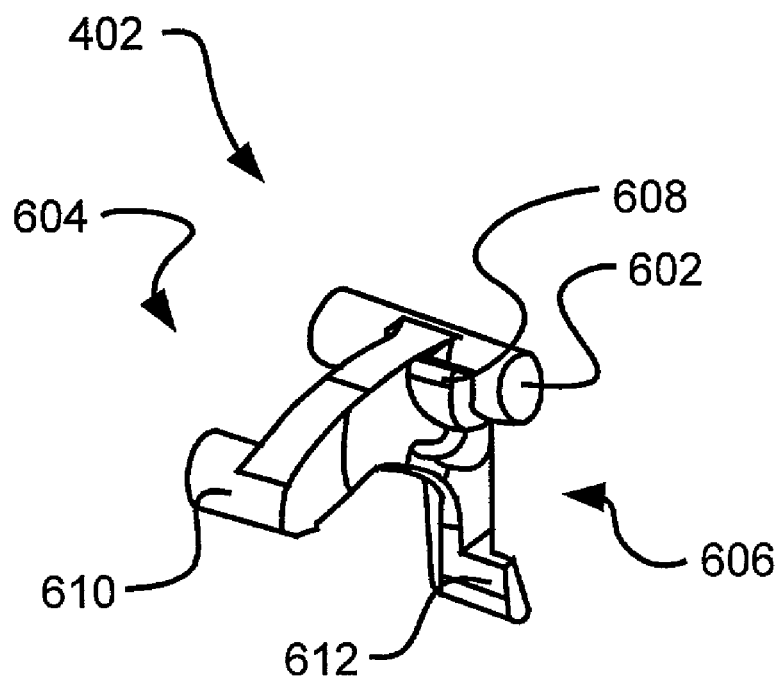
FIG. 6A is a first perspective view of the pivoted member of the universal cartridge magazine system of FIGS. 3, 4 and 5.

The sleeves 306 are associated with a universal biasing system, a universal indicator system, and a universal lockout system. The universal biasing system includes a bias spring 310, a dowel pin 408 (FIG. 4), and a slanted surface 620 (FIG. 6B) of a pivoted member 402 (FIGS. 4 and 6A). The universal indicator system includes a flag positioner 418 (FIG. 7A) having a flag 312, and an indicator pad 314 on the housing 302. The indicator pad 314 may be a white hot stamped pad to offer contrast to a barcode reader. The indicator pad 314 may also be a square, a triangle, or another shape. The universal lockout system is shown in FIGS. 4 and 6A.

Though FIG. 3 shows universal cartridge magazine 300 having five sleeves 306a, 306b, 306c, 306d, and 306e each associated with a universal biasing system, a universal indicator system, and a universal lockout system, it is not necessary that the universal cartridge magazine 300 include any particular number of sleeves. It also is not required that each of the sleeves 306 be associated with a universal biasing system, a universal indicator system, and a universal lockout system. Some sleeves 306 may be configured to store other types of data storage systems known in the art such as compact discs (CDs), floppy discs, and other types of cartridges configured according to other types of digital tape formats.

The top 318 of the housing 302 supports a pivoted member 402 (FIGS. 4 and 6A), the flag positioner 418 (FIG. 7), and a plurality of retaining elements 320. The retaining elements 320 are part of a cartridge holding system that keeps the cartridge systems in the universal cartridge magazine 300.

The housing 302 may be made of any of a wide range of materials, such as metals or plastics, including but not limited to steel or aluminum. In the interest of manufacturing and cost reduction, housing 302 is preferably made of a thermoplastic material, such as polycarbonate plastic with 10% by weight carbon and 10% Teflon to reduce friction and wear, although other moldable plastics may also be used.

FIG. 4 is a perspective exploded view of the universal cartridge magazine system 300 of FIG. 3. FIG. 4 shows the universal lockout system that includes a pivoted member 402 and a cam spring 404. The cam spring 404 may be integrally formed with a spring 406 that is associated with retaining elements 320. The retaining elements 320 may be a mold formed on a prong of the spring 406. The spring 406 may be snapped into the top 318 of the housing 302 in a manner that is known to those having ordinary skill in the art. Cam springs 404 may be stamped into spring 406. Cam springs 404 interact with the cam 608 (FIG. 6A) of the pivoted member 402 in order to bias the pivoted member 402 to return to a first pivoted member position 806 (FIG. 8A) when a sleeve is empty The springs 310 and dowel pins 408 included with the universal biasing systems are shown in FIG. 4. The housing 302 also includes dowel holes (not shown) for the dowel pins 408. The springs 310 are mounted to the second side (not shown) of the sleeve 306. For example, bias spring 310 associated with sleeve 306a is secured to the sleeve divider 308 that forms the second side of sleeve 306a such that the bowed leaf 416 of the bias spring 310 runs near the second side (not shown) of the sleeve 306a. Springs 310 are held in place by the dowel pins 408. The dowel pins are inserted through the dowel holes (not shown) of the housing 302.

The universal cartridge magazine 300 also includes a plate 410 for securing the spring 406 and pivoted member 402 to the top 318 of the housing 302. The plate 410 is secured to the top 318 of the housing 302 with screws 412.

The handle 304 pivots about two stub axles 414 (one shown in FIG. 4) protruding from the sides of the handle 304. The stub axles 414 are sized to fit in holes 326 in handle supports 324 at each end of the top 318 of the universal cartridge magazine 300.

The universal indicator system includes a flag positioner 418 associated with sleeve 306. The top 318 of housing 302 includes a plurality of flag positioner mounts 420 and a plurality of pivoted member mounts 422. The plurality of flag positioner mounts 420 and the plurality of pivoted member mounts 422 may be molded into the top 318 of the housing 302 or may be affixed to the top 318 of the housing 302. The pivot 702 (FIG. 7) of the flag positioner 418 is supported by one pivoted flag positioner mount 420. The pivot 602 of the pivoted member 402 is supported by one pivoted member mount 422. The plurality of flag positioner mounts 420 and the plurality of pivoted member mounts 422 support the flag positioner 418 and the pivoted member 402, respectively, but also allow the flag positioner 418 and the pivoted member 402 to rotate about their respective pivots 708 and 602. The retaining elements 320 may be a mold formed on a prong of the spring 406. Cam springs 404 of spring 406 hold the pivoted members 402 in the first pivoted member position 804 (FIG. 8A) when the sleeve 306 is empty. The cover 408 holds the spring 406 and the plurality of pivoted members 402 in place.

FIG. 5 is a perspective view of the universal cartridge magazine system of FIG. 3 having a DLT cartridge system 100 inserted into sleeve 306a, an LTO cartridge system 200 inserted into a sleeve 306b, and a third sleeve 306c that is empty. FIG. 5 shows flag 312 associated with the sleeve 306a has been forced to a DLT indictor position 502 near the top of the indicator pad 314 associated with sleeve 306a. FIG. 5 shows flag 312 associated with the sleeve 306b has been forced to an LTO indicator position 504 near the middle of the indicator pad 314 associated with the sleeve 306b. FIG. 5 also shows flag 312 associated with the sleeve 306c has been left in an empty sleeve position 506 near the bottom of the indicator pad 314 associated with the sleeve 306c.

FIG. 6A is a first perspective view of the pivoted member 402 of the universal cartridge magazine system 300 of FIGS. 3, 4 and 5. The pivoted member 402 includes a pivot 602 an arm 604 and a leg 606. The pivot 602 supports the pivoted member 402 from a pivot member mount 420 in the top 318 of the housing 302. The pivot 602 allows for partial rotation of the pivoted member 402 about the pivot 602. The pivoted member 402 includes a cam 608 near the pivot 602. The cam 608 allows the pivoted member 402 to be biased by the cam spring 404. The arm 604 includes a contact surface 610. The leg 606 includes a lever pad 612.

Figure 6B:
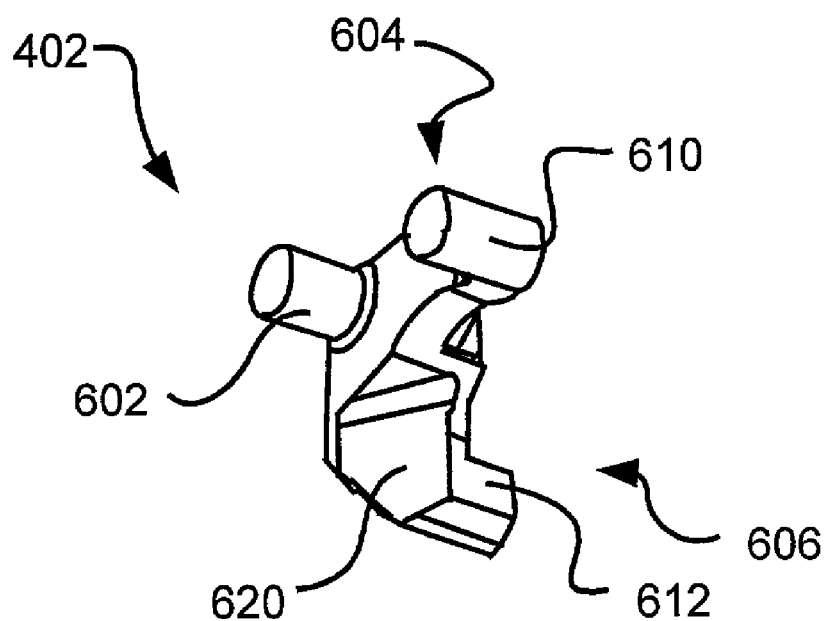
FIG. 6B is a second perspective view of the pivoted member of the universal cartridge magazine system of FIGS. 3, 4 and 5.

FIG. 6B is a second perspective view of the pivoted member 402 of the universal cartridge magazine system 300 of FIGS. 3, 4 and 5. FIG. 6B also shows a slanted surface 620 portion of the universal biasing system of the universal cartridge magazine system 300. The pivoted member 402 is positioned partially in the sleeve 306 such that if an LTO cartridge system 200 is inserted into the sleeve 306, the partially recessed first corner 214 of the LTO cartridge system 200 will strike the slanted surface 620 unless the LTO cartridge system 200 is inserted flush against the first side 322 of the sleeve 306. If the LTO cartridge system 200 is not inserted flush against the first side 322 of the sleeve 306, the slanted surface 620 will urge the LTO cartridge system 200 to move toward the first side 322 of the sleeve.

The pivoted member 402 may be made of any of a wide range of materials, such as metals or plastics, including but not limited to steel or aluminum. Pivoted member 402 is preferably made of Nylon 6/10 plastic with 30% by weight carbon and 15% Teflon to reduce friction and wear with the cartridge systems, although other moldable plastics may also be used.

Preferably pivoted member 402 is constructed from injection molded plastic, then pivot 602 is preferably a molded feature of the pivoted member 402. However, if pivoted member 402 is constructed out of another material, a pin may be used as the pivot 602. If a pin is used instead of the molded plastic pivot, the pin may be made of any of a wide range of materials, such as metals or plastics. Pin would preferably be made of a commercially available standard steel dowel pin, although other materials may also be used.

The pivoted members 402 are supported from the top 318 of the housing 302 by the pivoted member mounts 422 (FIG. 4). The pivoted member mounts 422 include a slot 422a (FIG. 4) and walls 422b (FIG. 4). When a pivoted member 402 is mounted in a pivoted member mount 422, the arm 604 and leg 606 may move in the slot 422a and the pivot 602 is captured by the walls 422b.

FIG. 7A is a first perspective view of the flag positioner 418 of the universal cartridge magazine system 300 of FIGS. 3, 4 and 5. The flag positioner 418 includes a support arm 702. The support arm 702 has a first end 704 and a second end 706. The first end 704 includes a pivot 708 for supporting the flag positioner 418 from the flag positioner mount 422 in the top 318 of the housing 302. The pivot 708 allows for partial rotation of the flag positioner 418 about the pivot 708. The second end 706 includes a contact surface 710, a flag support 712, and flag 312. Flag 312 may be a dark color, such as black, to contrast with the color, such as white, of the indicator pad 314. Contact surface 710 is angled to cushion the force of cartridge systems being inserted into the sleeve 306. A vertical stop 714 is mounted on the top surface 716 of the support arm 702. The bottom (not shown) of the vertical support 714 rests on the top 318 of the housing 302 and partially supports the flag positioner 418 when the sleeve 306 does not contain a cartridge system.

FIG. 7B is a second perspective view of the flag positioner 418 of the universal cartridge magazine system 300 of FIGS. 3, 4 and 5. FIG. 7B shows a dimple 720 protruding from the flag positioner 418. FIG. 7B also shows the bottom surface 722 of the support arm 702.

The flag positioners 418 are supported from the top 318 of the housing 302 by the flag positioner mounts 420 (FIG. 4). The flag positioner mounts 420 include a slot 420a (FIG. 4) and an indentation 420b (FIG. 4). When a flag positioner 418 is mounted in a flag positioner mount 420, the support arm 702 passes through the slot 420a and the pivot 708 is supported by the indentation 420b.

Figure 8A:
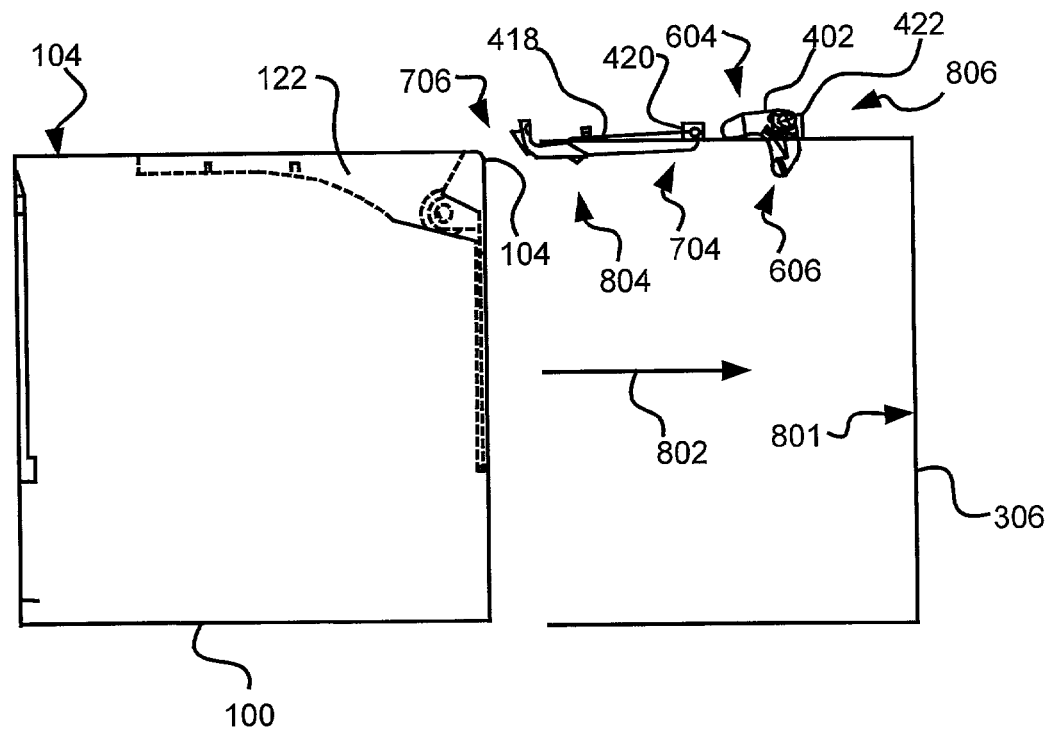
FIG. 8A is a side view showing the relationship between the DLT cartridge system of FIG. 1, the pivoted member of FIGS. 4, 6A and 6B, the flag positioner of FIGS. 4, 7A and 7B, and a cut-away view of the sleeve of the universal cartridge magazine of FIGS. 3, 4 and 5, immediately prior to the insertion of the DLT cartridge system into the sleeve.

FIG. 8A is a side view showing the relationship between the DLT cartridge system 100 of FIG. 1, the pivoted member 402 of FIGS. 4, 6A and 6B, the flag positioner 418 of FIGS. 4, 7A and 7B, and a cut-away view of the sleeve 306 of the universal cartridge magazine system 300 of FIGS. 3, 4 and 5 immediately prior to the insertion of the DLT cartridge system 100 into the sleeve 306. Arrow 802 indicates the direction of movement of the DLT cartridge system 100 into the sleeve 306 in the correct orientation so that the rear side 108 of the DLT cartridge system 100 faces the back side 801 of the sleeve 306. FIG. 8A shows the flag positioner 418 in a first position 804 where the first end 704 is supported by the flag positioner mount 420 on the top 318 of the housing 302 and the second end 706 is pulled down by gravity until the bottom surface of the vertical stop 714 is in contact with the top 318 of the housing 302.

FIG. 8A shows the pivoted member 402 in a first pivoted member position 806 where the arm 604 of the pivoted member 402 is in an approximately horizontal orientation and the leg 606 is in an approximately vertical orientation. The pivot 602 is supported by the pivoted member mount 422 on the top 318 of the housing 302.

Figure 8B:
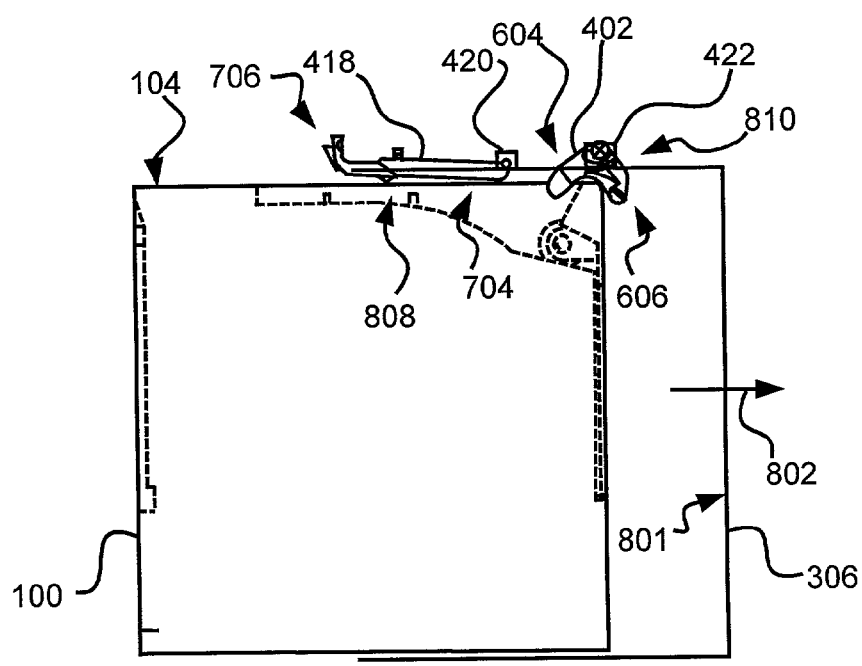
FIG. 8B is a side view showing the relationship between the DLT cartridge system of FIG. 1, the pivoted member of FIGS. 4, 6A and 6B, the flag positioner of FIGS. 4, 7A and 7B, and a cut-away view of the sleeve of the universal cartridge magazine of FIGS. 3, 4 and 5, when the DLT cartridge system is partially inserted into the sleeve.

FIG. 8B is a side view showing the relationship between the DLT cartridge system 100 of FIG. 1, the pivoted member 402 of FIGS. 4, 6A and 6B, the flag positioner 418 of FIGS. 4, 7A and 7B, and a cut-away view of the sleeve 306 of the universal cartridge magazine system 300 of FIGS. 3, 4 and 5, as the DLT cartridge system 100 is partially inserted into the sleeve 306. FIG. 8B shows the flag positioner 418 in a second position 808 where the first end 704 is supported by the flag positioner mount 420 on the top 318 of the housing 302 and the dimple 720 of the second end 706 is supported by the top 104 of the DLT cartridge system 100.

FIG. 8B shows the pivoted member 402 in a second pivoted member position 810 where leg 606 comes in contact with the first corner 114 of the DLT cartridge system 100 forcing the pivoted member 402 to rotate about the pivot 602 such that arm 604 of the pivoted member 402 enters the cavity 122 of the DLT cartridge system 100.

Figure 8C:
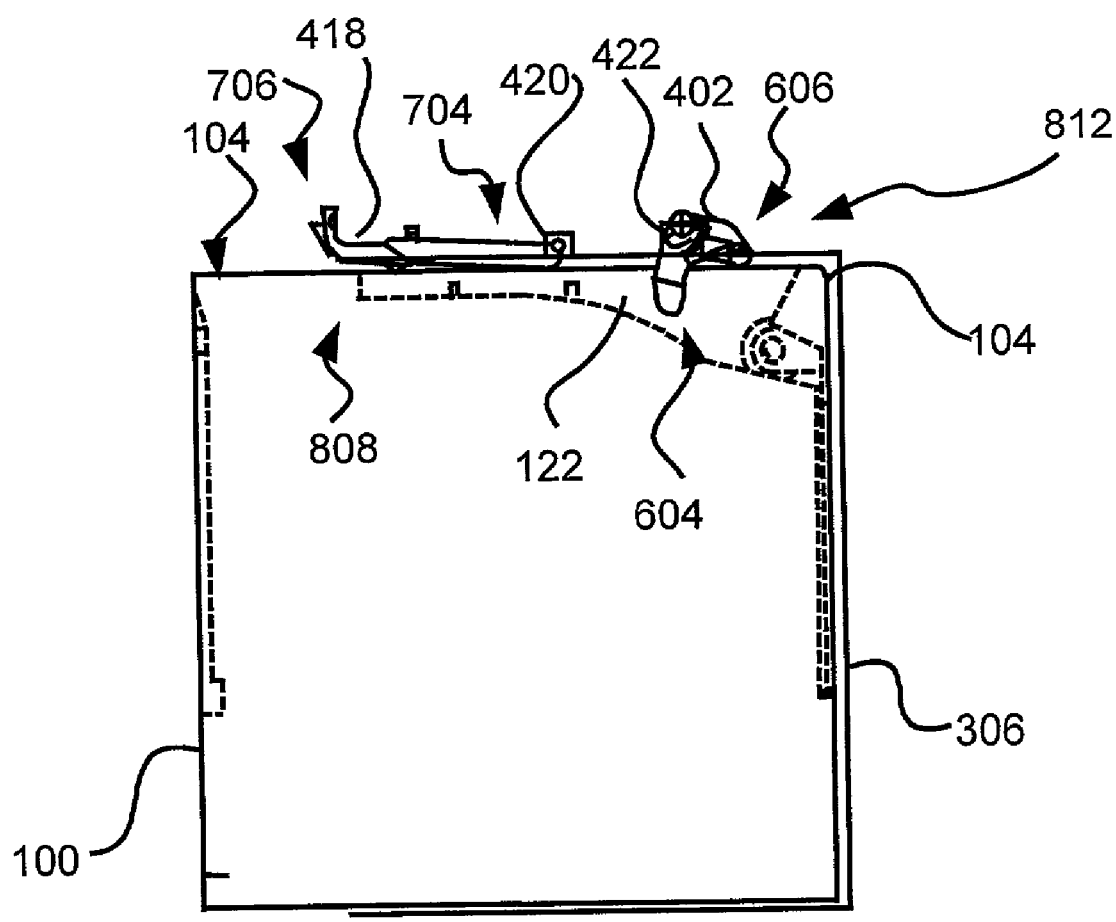
FIG. 8C is a side view showing the relationship between the DLT cartridge system of FIG. 1, the pivoted member of FIGS. 4, 6A and 6B, the flag positioner of FIGS. 4, 7A and 7B, and a cut-away view of the sleeve of the universal cartridge magazine of FIGS. 3, 4 and 5, as the DLT cartridge system is fully inserted into the sleeve.

FIG. 8C is a side view showing the relationship between the DLT cartridge system 100 of FIG. 1, the pivoted member 402 of FIGS. 4, 6A and 6B, the flag positioner 418 of FIGS. 4, 7A and 7B, and a cut-away view of the sleeve 306 of the universal cartridge magazine system 300 of FIGS. 3, 4 and 5, as the DLT cartridge system 100 is fully inserted into the sleeve 306. FIG. 8C shows the flag positioner 418 remains in the second position 808 where the first end 704 is supported by the flag positioner mount 420 on the top 318 of the housing 302. However, when the DLT cartridge system 100 is fully inserted in the sleeve 306, the second end 706 is supported by a different portion of the top 104 of the DLT cartridge system 100 than when the DLT cartridge system 100 is partially inserted as shown in FIG. 8B.

FIG. 8C shows the pivoted member 402 in a third pivoted member position 812 where the contact pad 612 of the leg 606 comes in contact with the top 104 of the DLT cartridge system 100. The contact with the top 104 of the DLT cartridge system 100 forces the pivoted member 402 to rotate further about the pivot 602 such that arm 604 of the pivoted member 402 is in an approximately vertical orientation inside the cavity 122 of the DLT cartridge system 100.

Figure 9A:
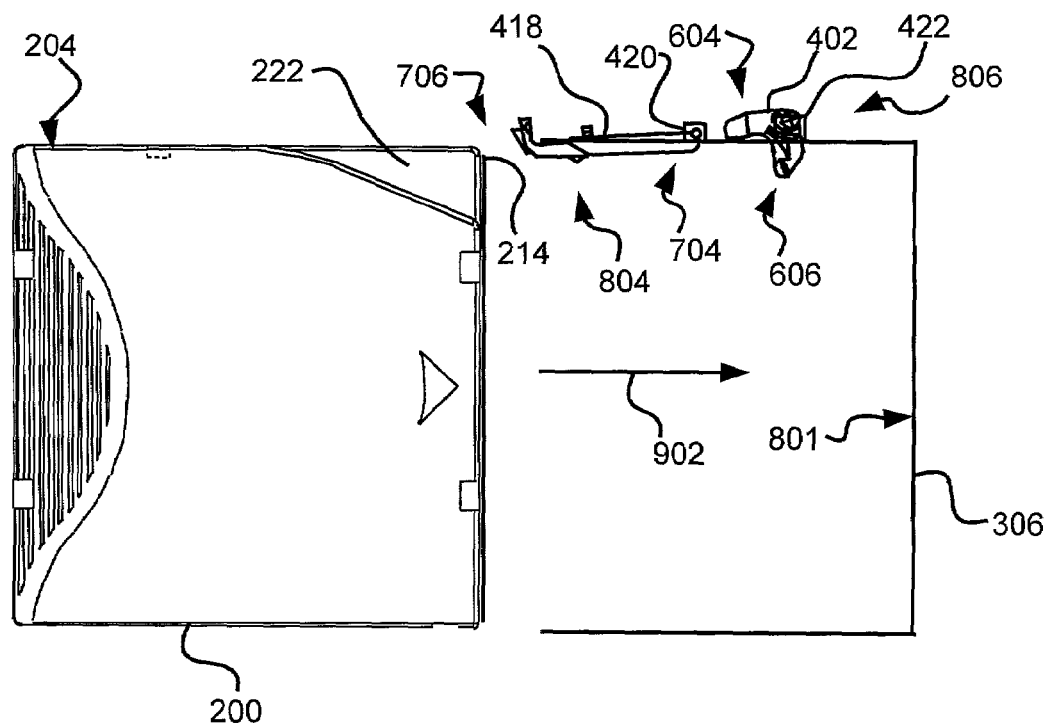
FIG. 9A is a side view showing the relationship between the LTO cartridge system of FIG. 2, the pivoted member of FIGS. 4, 6A and 6B, the flag positioner of FIGS. 4, 7A and 7B, and a cut-away view of the sleeve of the universal cartridge magazine of FIGS. 3, 4 and 5, immediately prior to the insertion of the LTO cartridge system into the sleeve.

FIG. 9A is a side view showing the relationship between the LTO cartridge system 200 of FIG. 2, the pivoted member 402 of FIGS. 4, 6A and 6B, the flag positioner 418 of FIGS. 4, 7A and 7B, and a cut-away view of the sleeve 306 of the universal cartridge magazine system 300 of FIGS. 3, 4 and 5, immediately prior to the insertion of the LTO cartridge system 200 into the sleeve 306. Arrow 902 indicates the direction of movement of the LTO cartridge system 200 into the sleeve 306 in the correct orientation so that the rear side 208 of the LTO cartridge system 200 faces the back side 801 of the sleeve 306. FIG. 9A shows the flag positioner 418 in the first position 804. FIG. 9A shows the pivoted member 402 in the first pivoted member position 806.

Figure 9B:
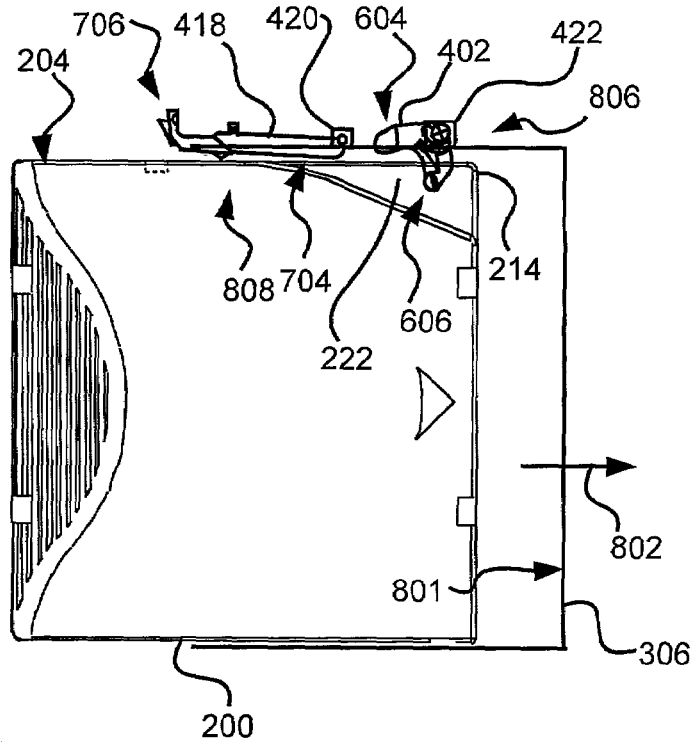
FIG. 9B is a side view showing the relationship between the LTO cartridge system of FIG. 2, the pivoted member of FIGS. 4, 6A and 6B, the flag positioner of FIGS. 4, 7A and 7B, and a cut-away view of the sleeve of the universal cartridge magazine of FIGS. 3, 4 and 5, as the LTO cartridge system is partially inserted into the sleeve.

FIG. 9B is a side view showing the relationship between the LTO cartridge system 200 of FIG. 2, the pivoted member 402 of FIGS. 4, 6A and 6B, the flag positioner 418 of FIGS. 4, 7A and 7B, and a cut-away view of the sleeve 306 of the universal cartridge magazine system 300 of FIGS. 3, 4 and 5, as the LTO cartridge system 200 is partially inserted into the sleeve 306. FIG. 9B shows the flag positioner 418 in the second position 808. FIG. 9B also shows the pivoted member 402 remains in the first pivoted member position 806 as the leg 606 enters the recess 222 formed by the partially recessed first corner 214 of the LTO cartridge system 200

Figure 9C:
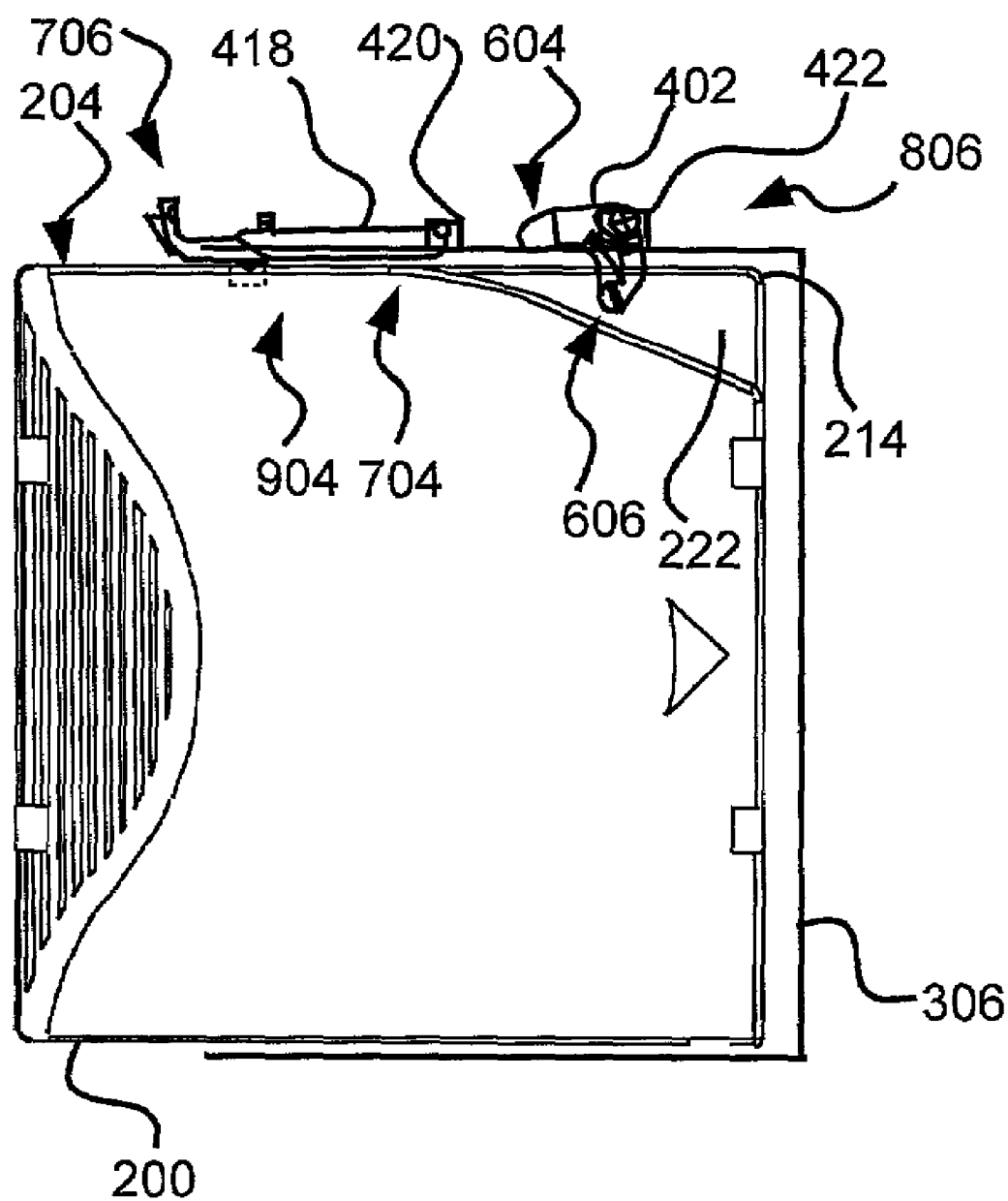
FIG. 9C is a side view showing the relationship between the LTO cartridge system of FIG. 2, the pivoted member of FIGS. 4, 6A and 6B, the flag positioner of FIGS. 4, 7A and 7B, and a cut-away view of the sleeve of the universal cartridge magazine of FIGS. 3, 4 and 5, when the LTO cartridge system is fully inserted into the sleeve.

FIG. 9C is a side view showing the relationship between the LTO cartridge system 200 of FIG. 2, the pivoted member 402 of FIGS. 4, 6A and 6B, the flag positioner 418 of FIGS. 4, 7A and 7B, and a cut-away view of the sleeve 306 of the universal cartridge magazine system 300 of FIGS. 3, 4 and 5, when the LTO cartridge system 200 is fully inserted into the sleeve 306. FIG. 9C shows the flag positioner 418 in a third position 904 where the first end 704 is still supported by the flag positioner mount 420 on the top 318 of the housing 302. However, when the LTO cartridge system 200 is fully inserted in the sleeve 306, the dimple 720 falls into the notch 216 and the bottom surface 722 of the support arm 702 is supported by the top 204 of the LTO cartridge system 200.

FIG. 9C shows the pivoted member 402 remains in the first pivoted member position 806 as the leg 606 further enters the recess 222 formed by the partially recessed first corner 214 of the LTO cartridge system 200.

In operation, sleeve 306 is configured to accept a cartridge system. The cartridge system may be a DLT cartridge system, such as DLT cartridge system 100, or an LTO cartridge system, such as LTO cartridge system 200. If the universal cartridge magazine system 300 includes a plurality of sleeves 306, such as the embodiment shown in FIG. 3, a DLT cartridge system 100 may be inserted in a first sleeve 306a while an LTO cartridge system 200 is inserted in a second sleeve 306b, or vice versa. Regardless of what type of cartridge system is inserted into the sleeve 306, the retaining element 320 is configured to hold the cartridge system in the universal cartridge magazine system 300. The handle 304 is configured to allow for easy transportation and handling of the universal cartridge magazine system 300. The universal lockout system is configured to prevent the insertion of a cartridge system in an incorrect orientation.

The universal indicator system is configured to provide a perceptible indication of whether the sleeve 306 is empty, whether the sleeve 306 contains a DLT cartridge system 100, or whether the sleeve contains an LTO cartridge system 200. The universal biasing system is configured to urge an LTO cartridge system 200 to the first side 322 of the sleeve 306. The retaining elements 320 may be a mold formed on a prong of the spring 406. Spring 406 also has a cam spring 404 that is a part of the universal lockout system and assists in the operation of the pivoted member 402. Although various functions for the various systems are mentioned immediately above, those skilled in the art will recognize that the various systems achieve additional functions.

The pivoted member 402 of the universal lockout system rotates about the pivot 602 into a cavity 122, in the DLT cartridge system 100, and enters a recess 222, in the LTO cartridge system 200, when the cartridge systems are installed in the correct orientation. If installation is attempted in any one of the various incorrect orientations, contact with the pivoted member 402 will impede the full insertion of the linear cartridge system into the sleeve 306 of the universal cartridge magazine system 300.

The universal lockout system ensures the cartridge systems can only be fully inserted in one "correct" orientation. The correct orientation depends upon the orientation of the tape drive (not shown). However, for purposes of illustration it can be assumed that the tape drive (not shown) is oriented to interact with a cartridge system that is inserted with the rear side, such as 108 and 208, toward the back side 801 of the sleeve 306 and the right side, such as 112 and 212, toward the second side (not shown) of the sleeve 306. Therefore, the correct orientation for insertion of the cartridge system is with the rear side, 108 and 208, toward the back side 801 of the sleeve 306 and the right side, such as 112 and 212, toward the second side (not shown) of the sleeve 306.

When a DLT cartridge system is inserted into the sleeve, regardless of the orientation, a first corner 114 of the DLT cartridge system 100 will make contact with the contact pad 612. If the DLT cartridge system 100 is pushed further into the sleeve 306, the pivoted member 402 will rotate about the pivot 602. If the DLT cartridge system 100 is inserted in the correct orientation, the rotation will force the contact surface 610 into the cavity 122 of the DLT cartridge system 100.

If a cartridge system, whether a DLT cartridge system 100 or an LTO cartridge system 200, is inserted in an incorrect orientation, a corner of the cartridge system will make contact with the contact pad 612 and force the pivoted member 402 to rotate about the pivot 602. The contact surface 610 will then make contact with one of the surfaces of the incorrectly oriented cartridge system and prevent the full insertion of the cartridge system into the sleeve 306. The cam 608 interacts with the cam spring 404 of the spring 406 in order to force the pivoted member 402 back to the first pivoted member position 806 when the cartridge system is withdrawn from the sleeve 306.

When an LTO cartridge system 200 is inserted in the correct orientation there are two possible scenarios for the interaction of the pivoted member 402 and the LTO cartridge system 200. In the first scenario, the LTO cartridge system 200 may be inserted flush against the first side 322 of the sleeve 306. In the first scenario, the LTO cartridge system 200 can be fully inserted without making contact with the pivoted member 402. In the second scenario, the LTO cartridge system 200 is not inserted flush against the first side 322 of the sleeve 306. In the second scenario, the first corner 214 of the LTO cartridge system 200 will contact the slanted surface 620 of the pivoted member 402. The slanted surface 620 may force the LTO cartridge system to slide towards the first side 322 without moving the pivoted member 402, or the contact may cause the pivoted member 402 to rotate about the pivot 602 until contact surface 610 hits the top 204 of the LTO cartridge system 200. As insertion of the LTO cartridge system 200 continues into sleeve 306, contact between the first corner 214 and the slanted surface 620 causes the LTO cartridge system 200 to slide until it is flush against the first side 322 of the sleeve 306.

The universal indicator system uses distinct features of the DLT cartridge system 100 and the LTO cartridge system 200 to change the position of the flag positioner 418. The various positions of the flag 312 associated with the flag positioner 418 provide an indication of the content of the sleeve 306. The indication of the content of the sleeve 306 may be read by an optical device such as a barcode scanner or other types of readers known to those having ordinary skill in the art.

When a DLT cartridge system 100 is inserted into sleeve 306, bowed leaf 416 of the bias spring 310 is flattened against the second side (not shown) of the sleeve 306. When a thinner LTO cartridge system 200 is inserted into the sleeve 306, the bowed leaf 416 of the bias spring 310 pushes the bottom portion 218 of the LTO cartridge system 200 toward the first side 322 of the sleeve 306. Forcing the LTO cartridge system 200 consistently to one side of the sleeve 306 optimizes the performance of the cartridge moving device (not shown).

Therefore, having thus described the invention, at least the following is claimed:

1. A lockout system ensuring that a linear tape cartridge is inserted into a sleeve of a housing in a correct orientation, the sleeve of the housing being configured to alternately receive therein a digital linear tape (DLT) cartridge and a linear tape open (LTO) cartridge, the DLT cartridge having a cavity located in an upper surface thereof, the LTO cartridge having recess located in a side surface thereof, said lockout system comprising:

a pivoted member pivotally attached to the housing, said pivoted member having a leg and an arm, said leg extending in a first direction, said leg having a slanted surface that is inclined with respect to an insertion direction of a linear tape cartridge into the sleeve, said arm extending in a second direction;

said pivoted member being rotatable between a first position and a second position, in said first position said leg extending into the sleeve such that:

in said first position, insertion of an LTO cartridge into the sleeve in the insertion direction causes the side surface of the LTO cartridge to contact said slanted surface of said leg, wherein further insertion of the LTD cartridge into the sleeve causes said slanted surface to urge the LTO cartridge toward a side of the sleeve; and in said first position, insertion of a DLT cartridge into the sleeve in the insertion direction causes the upper surface of the DLT cartridge to contact said leg, wherein further insertion of the DLT cartridge into the sleeve causes said pivoted member to rotate to said second position, in which said arm extends into the recess of the DLT cartridge.

2. The lockout system of claim 1, further comprising:
a lever pad residing on a distal end of said leg; and
a contact surface residing on a distal end of said arm, wherein insertion of an incorrectly oriented DLT cartridge is prevented when contact between said lever pad and a leading edge of the DLT cartridge causes rotation of the pivoted member such that said contact surface comes into contact with a portion of the DLT cartridge.

3. The lockout system of claim 1, further comprising a cam residing on said pivoted member, wherein the cam is biased such that, when the sleeve is empty, the pivoted member is urged to said first position.

4. The lockout system of claim 1, wherein said arm makes contact with a top of the second type of cartridge when inserted in an incorrect orientation such that the contact prevents full insertion of the second type of cartridge in the sleeve.

5. The lockout system of claim 1, wherein said arm makes contact with a top of an LTO cartridge when inserted into the aleeve in an incorrect orientation such that the contact prevents full insertion of the LTO cartridge in the sleeve.

6. The lockout system of claim 1, wherein, in the first position, said leg extends downwardly into the sleeve.

7. The lockout system of claim 1, wherein said arm and said leg are substantially perpendicular to each other.

8. A lockout system ensuring that a linear tape cartridge is mounted in a correct orientation for use, said lockout system comprising:
    a housing configured to mount linear tape cartridges, said housing having a sleeve, said sleeve being configured to alternately receive therein a first linear tape cartridge and a second linear tape cartridge, the first linear tape cartridge having a cavity located in an upper surface thereof, the second linear tape cartridge having a recess located in a side surface thereof; and
    a pivoted member attached to the housing, said pivoted member having a leg and an arm, said leg having a slanted surface inclined with respect to an insertion direction of a linear tape cartridge into said sleeve, said pivoted member being rotatable between a first position and a second position such that:
        in said first position, insertion of the second linear tape cartridge into said sleeve in said insertion direction causes the side surface of the second linear tape cartridge to contact said slanted surface of said leg, wherein further insertion of the second linear tape cartridge into said sleeve causes said slanted surface to urge the second linear tape cartridge toward a side of said sleeve; and
        in said firer position, insertion of the first linear tape cartridge into said sleeve in said insertion direction causes the upper surface of the first linear tape cartridge to contact said leg, wherein further insertion of the first linear tape cartridge into said sleeve causes said pivoted member to rotate to said second position, in which said arm extends into the recess of the first linear tape cartridge.

9. The lockout system of claim 8, further comprising:
    a contact surface located on said arm, wherein incorrect insertion of the second linear tape cartridge within said sleeve is prevented by rotation of said pivoted member such that said contact surface comes into contact with a portion of the second linear tape cartridge.

10. The lockout system of claim 8, further comprising:
    a cam located on said pivoted member; and
    a cam spring associated with said sleeve such that, when said sleeve does not have a linear tape cartridge mounted therein, interaction of said cam with said cam spring urges said pivot member to said first position.

11. The lockout system of claim 8, further comprising;
    means for urging said pivoted member to said first position.

12. The lockout system of claim 8, wherein the first linear tape cartridge is a linear tape open (LTO) cartridge.

13. The lockout system of claim 8, wherein the second linear tape cartridge is a digital linear tape (DLT) cartridge.

14. The lockout system of claim 8, wherein said arm makes contact with a top of the second linear tape cartridge when inserted in an incorrect orientation such that the contact prevents full insertion of the second linear tape cartridge in said sleeve.

15. The lockout system of claim 8, wherein said arm makes contact with a top of the first linear tape cartridge when inserted into said sleeve in an incorrect orientation such that the contact prevents full insertion of the first linear tape cartridge in the sleeve.

16. The lockout system of claim 8, wherein, in the first position, said leg extends downwardly into said sleeve.

17. The lockout system of claim 8, wherein said arm and said leg are substantially perpendicular to each other.

18. A lockout system ensuring that a linear tape cartridge is mounted in a correct orientation for use, said lockout system comprising:
    a housing configured to mount linear tape cartridges, said housing having a sleeve, said sleeve being configured to alternately receive therein, in an insertion direction, a first linear tape cartridge and a second linear tape cartridge, the first linear tape cartridge having a cavity located in an upper surface thereof, the second linear tape cartridge having a recess located in a side surface thereof; and
    a pivoted member attached to the housing, said pivoted member having a leg and an arm, said pivoted member being rotatable between a first position and a second position such that, in said first position, insertion of the first linear tape cartridge into said sleeve in said insertion direction causes the upper surface of the first linear tape cartridge to contact said leg, wherein further insertion of the first linear tape cartridge into said sleeve causes said pivoted member to rotate to said second position, in which said arm extends into the recess of the first linear tape cartridge.

19. The lockout system of claim 18, wherein said leg has a slanted surface inclined with respect to said insertion direction such that, in said first position, insertion of the second linear tape cartridge into said sleeve in said insertion direction causes the side surface of the second linear tape cartridge to contact said slanted surface of said leg wherein further insertion of the second linear tape cartridge into said sleeve causes said slanted surface to urge the second linear tape cartridge toward a side of said sleeve.

20. The lockout system of claim 18, wherein the first linear rape cartridge is a linear tape open (LTO) cartridge and the second linear rape cartridge is a digital linear tape (DLT) cartridge.

* * * * *

UNITED STATES PATENT AND TRADEMARK OFFICE
CERTIFICATE OF CORRECTION

PATENT NO. : 7,019,940 B2  Page 1 of 1
APPLICATION NO. : 09/961990
DATED : March 28, 2006
INVENTOR(S) : Mark A. Smith et al.

It is certified that error appears in the above-identified patent and that said Letters Patent is hereby corrected as shown below:

In column 12, line 40, in Claim 1, after "having" insert -- a --.

In column 12, line 55, in Claim 1, delete "LTD" and insert -- LTO --, therefor.

In column 13, line 17, in Claim 5, delete "aleeve" and insert -- sleeve --, therefor.

In column 13, line 47, in Claim 8, delete "firer" and insert -- first --, therefor.

In column 14, line 5, in Claim 11, delete "comprising;" and insert -- comprising: --, therefor.

In column 14, line 53, in Claim 19, after "leg" insert -- , --.

In column 14, line 58, in Claim 20, delete "rape" and insert -- tape --, therefor.

In column 14, line 59, in Claim 20, delete "rape" and insert -- tape --, therefor.

Signed and Sealed this

Second Day of June, 2009

JOHN DOLL
*Acting Director of the United States Patent and Trademark Office*